US012700593B2

(12) United States Patent
Chen et al.

(10) Patent No.: US 12,700,593 B2
(45) Date of Patent: Aug. 4, 2026

(54) BINDER, PREPARATION METHOD THEREFOR, SECONDARY BATTERY, BATTERY MODULE, BATTERY PACK AND POWER CONSUMING DEVICE

(71) Applicant: CONTEMPORARY AMPEREX TECHNOLOGY (HONG KONG) LIMITED, Hong Kong (CN)

(72) Inventors: Yu Chen, Ningde (CN); Shaohua Ai, Ningde (CN); Yuxi Zhang, Ningde (CN); Qi Zeng, Ningde (CN); Xin Zhou, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 309 days.

(21) Appl. No.: 18/426,374

(22) Filed: Jan. 30, 2024

(65) Prior Publication Data

US 2024/0194879 A1 Jun. 13, 2024

Related U.S. Application Data

(63) Continuation of application No. PCT/CN2022/096059, filed on May 30, 2022.

(51) Int. Cl.
*H01M 4/62* (2006.01)
*C08F 210/02* (2006.01)
*C08F 220/14* (2006.01)

(52) U.S. Cl.
CPC ........... *H01M 4/622* (2013.01); *C08F 210/02* (2013.01); *C08F 220/14* (2013.01)

(58) Field of Classification Search
CPC .................................................... H01M 4/622
See application file for complete search history.

(56) References Cited

U.S. PATENT DOCUMENTS

| | | | |
|---|---|---|---|
| 3,029,228 | A | 4/1962 | Glavis |
| 9,570,751 | B2 | 2/2017 | Cha et al. |
| 2014/0239239 | A1 | 8/2014 | Cha et al. |

FOREIGN PATENT DOCUMENTS

| | | | |
|---|---|---|---|
| CN | 105794029 | A | 7/2016 |
| CN | 108520958 | A | 9/2018 |

(Continued)

OTHER PUBLICATIONS

Fujiwara, et al., EPO Machine Translation of JP2013030449A Slurry for Positive Electrode, European Patent Office, 1-18 (Year: 2013).*

(Continued)

*Primary Examiner* — Nicole M. Buie-Hatcher
*Assistant Examiner* — Krishna R Hammond
(74) *Attorney, Agent, or Firm* — K&L Gates LLP

(57) ABSTRACT

The present application provides a binder, a preparation method therefor, a secondary battery, a battery module, a battery pack, and a power consuming device. The binder is a polymer containing structural units as represented by formula I and formula II,

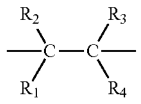

(I)

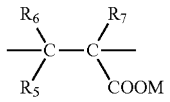

(II)

wherein $R_1$, $R_2$, $R_3$, $R_5$, $R_6$, and $R_7$ are each independently selected from hydrogen or $C_{1-3}$ alkyl unsubstituted or (Continued)

5 substituted by a substituent, $R_4$ is selected from hydrogen, cyano, an aldehyde group, or an ester group, and M is selected from H, Li, Na, K or $NH_4$. The binder of the present application has excellent swelling resistance, and the corresponding secondary batteries have significantly improved cycling performance and power performance.

11 Claims, 3 Drawing Sheets

(56) References Cited

FOREIGN PATENT DOCUMENTS

| | | | | |
|---|---|---|---|---|
| CN | 109777328 A | | 5/2019 | |
| CN | 111234105 A | | 6/2020 | |
| CN | 113045702 A | | 6/2021 | |
| CN | 109216659 B | | 1/2022 | |
| CN | 110137496 A | | 4/2022 | |
| JP | 1978059789 A | | 5/1978 | |
| JP | 1985079015 A | | 5/1985 | |
| JP | 2000195521 A | | 7/2000 | |
| JP | 2008066274 A | | 3/2008 | |
| JP | 2012221685 A | | 11/2012 | |
| JP | 2013030449 A | * | 2/2013 | |
| JP | 2013062080 A | | 4/2013 | |
| JP | 2018037280 A | | 3/2018 | |
| JP | 2018090750 A | | 6/2018 | |
| KR | 20030061239 A | | 7/2003 | |
| KR | 20110004290 A | | 1/2011 | |
| KR | 20210143186 A | | 11/2021 | |
| WO | 2015/146787 A1 | | 10/2015 | |
| WO | 2018/168615 A1 | | 9/2018 | |
| WO | 2019/009178 A1 | | 1/2019 | |
| WO | 2021153376 A1 | | 8/2021 | |
| WO | WO-2021253787 A1 | * | 12/2021 | ............ H01M 10/54 |

OTHER PUBLICATIONS

International Search Report received in the corresponding international application PCT/CN2022/096059, mailed Feb. 17, 2023.

Office Action issued to related JP Patent Application No. 2023-565900, dated Jan. 28, 2025, 8 pages, with English translation.

The extended European search report received in the corresponding European application 22938758.4, mailed on Sep. 23, 2024.

Notice of Reasons for Refusal received in the corresponding Japanese application 2023-565900, mailed on Oct. 28, 2024.

The Notice of Reasons for Refusal received in the corresponding JP application 2023-565900, dated May 7. 2025, 12 pages with English translation.

Decision to Grant (with English Machine Translation), mailed Aug. 18, 2025, for corresponding Japanese Patent Application Serial No. 2023-565900.

Office Action (with English Machine Translation), mailed Jul. 24, 2025, for corresponding Korean Patent Application Serial No. 10-2023-7036984.

Office Action (with English Machine Translation), mailed Mar. 30, 2026, for corresponding Korean Patent Application Serial No. 10-2023-7036984.

* cited by examiner

BINDER, PREPARATION METHOD THEREFOR, SECONDARY BATTERY, BATTERY MODULE, BATTERY PACK AND POWER CONSUMING DEVICE

CROSS REFERENCE TO RELATED APPLICATION

The present application is a continuation of International Patent Application No. PCT/CN2022/096059, filed on May 30, 2022 and entitled "BINDER, PREPARATION METHOD THEREFOR, SECONDARY BATTERY, BATTERY MODULE, BATTERY PACK AND POWER CONSUMING DEVICE", the contents of which are incorporated herein by reference.

TECHNICAL FIELD

The present application relates to the technical field of lithium batteries, and in particular to a binder, a preparation method therefor, a secondary battery, a battery module, a battery pack and a power consuming device.

BACKGROUND ART

In recent years, lithium ion batteries have been widely used in energy storage power systems such as hydroelectric, thermal, wind and solar power plants, as well as electric tools, electric bicycles, electric motorcycles, electric vehicles, military equipment, aerospace and other fields. With the application of lithium ion battery being popularized, higher requirements have been put forward for the lithium ion batteries in terms of cycling performance, service life, etc.

A binder is a commonly used material in lithium ion batteries and is in great demand in the electrode plates, separators, packaging sites of the battery. However, the existing binders have poor bonding performance, leading to a significant decrease in battery performance during use, and thus the service life of the battery is affected. Therefore, the existing binders still need to be improved.

SUMMARY OF THE INVENTION

The present application has been made in view of the above problem, and an object of the present application is to provide a binder and an electrode comprising same, in order to reduce the swelling of the binder in the electrolyte solution, thereby improving the performance of the battery.

A first aspect of the present application provides a binder, which is a polymer containing the structural units as represented by formula I and formula II, (I)

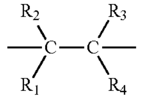

(II)

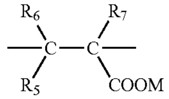

wherein $R_1$, $R_2$, $R_3$, $R_5$, $R_6$, and $R_7$ are each independently selected from hydrogen or $C_{1-3}$ alkyl unsubstituted or substituted by a substituent, $R_4$ is selected from hydrogen, cyano, an aldehyde group, or an ester group, and M is selected from H, Li, Na, K or $NH_4$.

Thus, in the present application, by comprising a —COOM group (i.e., a carboxylic acid or carboxylate group), the polarity of the polymer can be improved, such that the absorption of the solvent by the binder in the electrolyte solution can be reduced, thereby reducing the swelling rate of the electrodes as well as the direct current resistance of the battery, and improving the power performance and cycling performance of the battery. Meanwhile, the carboxylic acid or carboxylate groups have higher chemical stability and oxidation stability in the electrolyte solution. In addition, the metal cations such as $Li^+$, $Na^+$, etc., which are generated by the ionization of the carboxylates present in the polymer, can increase the content of the dissociated ions in the electrolyte solution of the battery and facilitate the transport of the charge carriers, and thus the dynamic performance of the battery is improved.

In any embodiment, the molar content of the structural unit represented by formula II is 0.1%-60%, or 10%-40%, based on the total number of moles of all structural units in the polymer. By controlling the proportion of the structural unit represented by formula II, both the solubility of the binder in an oily solvent and the absorption of the electrolyte solution by the binder can be taken into account, thus reducing the direct current resistance of the battery and improving the power performance and cycling performance of the battery.

In any embodiment, the polymer comprises a first structural unit represented by formula I where $R_4$ is an aldehyde group or an ester group and a second structural unit represented by formula I where $R_4$ is hydrogen or cyano, wherein the first structural unit is different from the second structural unit. The combination of the first structural unit and the second structural unit enables the polymer to have both strength and flexibility and binding performance. Moreover, the absorption of electrolyte solution by the binder is reduced, thus improving the swelling resistance of the electrode.

In any embodiment, the molar content of the second structural unit is 20%-90%, optionally 50%-80%, based on the total number of moles of all structural units in the polymer. By controlling the proportion of the second structural unit in the polymer, the binding performance of the polymer can be improved and the absorption of the electrolyte solution by the binder can be reduced.

A second aspect of the present application provides a method for preparing a binder, and the method comprises:

preparation of an intermediate polymer: polymerizing a monomer represented by formula III to form an intermediate polymer containing at least cyano, an aldehyde group or an ester group, (III)

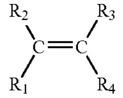

wherein in formula III, $R_1$, $R_2$, and $R_3$ are each independently selected from hydrogen and substituted or unsubstituted $C_{1-3}$ alkyl, and $R_4$ is selected from hydrogen, cyano, an aldehyde group, or an ester group; and modification reaction: subjecting the intermediate polymer and an aqueous solution of an alkaline substance to a modification reaction, such that at least part of the cyano, aldehyde groups or ester groups in the intermediate polymer are converted into COOM groups, wherein M is selected from H, Li, Na, K or $NH_4$.

The method involves a simple preparation process, abundant raw material, and low costs. Through the hydrolysis reaction of cyano group, aldehyde group and ester group under alkaline conditions, they are partially or completely converted into carboxylic acid or carboxylate group, which improves the polarity of the polymer, reduces the absorption of the electrolyte solution by the binder, especially the polyester electrolyte solutions, and simultaneously improves the chemical stability and oxidation stability of the binder. In addition, the metal cations such as $Li^+$, $Na^+$, etc., which are generated by the ionization of the carboxylates present in the polymer, can increase the content of the dissociated ions in the electrolyte solution of the battery and facilitate the transport of the charge carriers, and thus the dynamic performance of the battery is improved.

In any embodiment, in the step of the preparation of the intermediate polymer, the monomer is selected from a first monomer represented by formula III where $R_4$ is cyano, an aldehyde group or an ester group and a second monomer represented by formula III where $R_4$ is hydrogen or cyano, and the second monomer is different from the first monomer in structure.

In any embodiment, the first monomer is selected from one or more of acrolein, acrylonitrile, methyl acrylate, ethyl acrylate, butyl acrylate, isooctyl acrylate, and methyl methacrylate.

In any embodiment, the second monomer is selected from one or more of ethylene, propylene, butylene, and acrylonitrile.

In any embodiment, the molar ratio of the second monomer to the first monomer is 2:8-9:1, optionally 3:7-8:2, further optionally 5:5-8:2. By adjusting and controlling the proportion of the second monomer to the first monomer in a suitable range, the liquid absorption, flexibility and processability of the binder can be taken into account.

In any embodiment, the intermediate polymer has a weight average molecular weight of $5\times10^4$–$1.5\times10^6$, optionally $1.5\times10^5$–$8\times10^5$. By controlling the weight average molecular weight of the intermediate polymer, the processability of the intermediate polymer can be adjusted. If the molecular weight is too low, the brittleness is high and the bonding force is insufficient; and if the molecular weight is too high, it is easy to gel, and the modified product is prone to aggregate and difficult to extract.

In any embodiment, the alkaline substance is selected from one or more of lithium hydroxide, sodium hydroxide, potassium hydroxide, and ammonia water. The above materials are common and easy to obtain, low in cost, and conducive to popularization and application.

In any embodiment, the molar ratio of the total amount of the cyano, aldehyde and ester functional groups in the first monomer to that of the alkaline substance is 1:0.1-1:2, or 1:0.5-1:1.5. By adjusting and controlling the molar ratio of the total amount of the cyano, aldehyde and ester functional groups in the first monomer to that of the alkaline substance in a suitable range, the degree of hydrolysis of the functional groups can be controlled, so as to ensure that the absorption of the electrolyte solution by the intermediate polymer is reduced and the solubility thereof in an oily solvent is improved, and meanwhile, the service performance and processability of the electrode plates are taken into account.

In any embodiment, the reaction temperature of the modification reaction is 35° C.-120° C., optionally 60° C.-90° C. By adjusting and controlling the reaction temperature in a suitable range, the degree of hydrolysis of the functional groups can be controlled, so as to ensure that the absorption of the electrolyte solution by the intermediate polymer is reduced and the solubility thereof in an oily solvent is improved, and meanwhile, the service performance and processability of the electrode plates are taken into account.

In any embodiment, the reaction time of the modification reaction is 1 h-24 h, optionally 4 h-10 h. By adjusting and controlling the reaction time in a suitable range, the degree of hydrolysis of the functional groups can be controlled, so as to ensure that the absorption of the electrolyte solution by the intermediate polymer is reduced and the solubility thereof in an oily solvent is improved, and meanwhile, the service performance and processability of the electrode plates are taken into account.

In any embodiment, the method further comprises at the end of the modification reaction, adding an acidic solution to the reaction product to adjust the pH value of the reaction system to 6-8. By adjusting the pH value of the reaction system to weak acidity or neutrality, it is possible to prevent the binder from causing the gelatinization of the slurry during the preparation of the electrode slurry, thus improving the stability of the slurry.

A third aspect of the present application provides a secondary battery comprising an electrode assembly and an electrolyte solution, wherein the electrode assembly comprises a positive electrode plate, a separator, and a negative electrode plate, and the positive electrode plate comprises a positive electrode active material and a binder of the first or the second aspect of the present application. The positive electrode plate has low swelling rate in the electrolyte solution, such that the internal resistance of the battery is reduced, and the power performance and cycling performance of the battery is improved.

A fourth aspect of the present application provides a battery module, comprising a secondary battery in the third aspect of the present application. The battery has reduced internal resistance and improved power performance and cycling performance.

A fifth aspect of the present application provides a battery pack, comprising a battery module in the fourth aspect of the present application.

A sixth aspect of the present application provides a power consuming device, comprising at least one of a secondary battery in the third aspect of the present application, a battery module in the fourth aspect of the present application, and a battery pack in the fifth aspect of the present application.

Since the battery module in the fourth aspect and the battery pack in the fifth aspect of the present application comprises a secondary battery in the third aspect, the battery module and the battery pack have the same advantages as the secondary battery.

LIST OF REFERENCE NUMERALS

Figure 1:
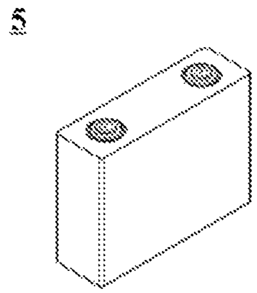
FIG. 1 shows a schematic diagram of a secondary battery according to an embodiment of the present application.

1—battery pack; 2—upper box body; 3—lower box body; 4—battery module; 5—secondary battery; 51—housing; 52—electrode assembly; 53—top cover assembly

DETAILED DESCRIPTION OF EMBODIMENTS

Hereafter, embodiments of the binder, preparation method therefor, electrode, battery, and power consuming device of the present application are specifically disclosed in the detailed description with reference to the accompanying drawings as appropriate. However, unnecessary detailed illustrations may be omitted in some instances. For example, there are situations where detailed description of well known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in the claims.

The "ranges" disclosed in the present application are defined in the form of lower and upper limits. A given range is defined by selecting a lower limit and an upper limit, and the selected lower and upper limits defining the boundaries of the particular range. Ranges defined in this manner may be inclusive or exclusive, and may be arbitrarily combined, that is, any lower limit may be combined with any upper limit to form a range. For example, if the ranges 60-120 and 80-110 are listed for a particular parameter, it should be understood that the ranges 60-110 and 80-120 are also contemplated. Additionally, if minimum range values 1 and 2 are listed and maximum range values 3, 4, and 5 are listed, the following ranges are all contemplated: 1-3, 1-4, 1-5, 2-3, 2-4 and 2-5. In the present application, unless stated otherwise, the numerical range "a-b" denotes an abbreviated representation of any combination of real numbers between a and b, where both a and b are real numbers. For example, the numerical range "0-5" means that all the real numbers between "0-5" have been listed herein, and "0-5" is just an abbreviated representation of combinations of these numerical values. In addition, when a parameter is expressed as an integer ≥2, it is equivalent to disclosing that the parameter is, for example, an integer of 2, 3, 4, 5, 6, 7, 8, 9, 10, 11, 12, etc.

All the embodiments and optional embodiments of the present application can be combined with one another to form new technical solutions, unless otherwise stated.

All technical features and optional technical features of the present application can be combined with one another to form a new technical solution, unless otherwise stated.

Unless otherwise stated, all the steps of the present application may be performed sequentially or randomly, preferably sequentially. For example, the method including steps (a) and (b) indicates that the method may comprise steps (a) and (b) carried out sequentially, and may also comprise steps (b) and (a) carried out sequentially. For example, reference to "the method may further comprise step (c)" indicates that step (c) may be added to the method in any order, e.g., the method may comprise steps (a), (b) and (c), steps (a), (c) and (b), or steps (c), (a) and (b).

The terms "comprise" and "include" mentioned in the present application are open-ended or may also be closed-ended, unless otherwise stated. For example, "comprise" and "include" may mean that other components not listed may further be comprised or included, or only the listed components may be comprised or included.

In the present application, the term "or" is inclusive unless otherwise specified. For example, the phrase "A or B" means "A, B, or both A and B". More specifically, the condition "A or B" is satisfied by any one of the following: A is true (or present) and B is false (or not present); A is false (or not present) and B is true (or present); or both A and B are true (or present).

As the cost of PVDF raw materials increases, some non-fluorinated ester-containing binders having good flexibility have been used in the manufacturing process of the electrode plate. However, such ester-containing binders significantly aggravates the swelling degree of the electrode plate in the electrolyte solution due to the absorption of the binder itself to the electrolyte solution, which in turn leads to a significant decrease in the cycling performance and power performance of the battery. In view of the above technical problems, the present application develops a binder that gives an electrode plate excellent swelling resistance, significantly improving the power performance and cycling performance of the battery.

[Binder]

On this basis, the present application provides a binder, which is a polymer containing the structural units as represented by formula I and formula II, (I)

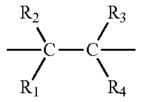

(II)

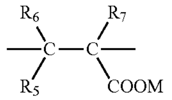

wherein $R_1$, $R_2$, $R_3$, $R_5$, $R_6$, and $R_7$ are each independently selected from hydrogen or $C_{1-3}$ alkyl unsubstituted or substituted by a substituent, $R_4$ is selected from hydrogen, cyano, an aldehyde group, or an ester group, and M is selected from H, Li, Na, K or $NH_4$.

Herein, the term "binder" means a chemical compound, polymer or mixture that forms a colloidal solution or a colloidal dispersion in a dispersion medium.

In some embodiments, the dispersion medium of the binder is an aqueous solvent, such as water. In some embodiments, the dispersion medium of the binder is an oily solvent, and examples of the oily solvent include, but are not limited to, dimethylacetamide, N,N-dimethylformamide, N-methyl-pyrrolidone, acetone, dimethyl carbonate, ethyl cellulose, and polycarbonate.

In some embodiments, the binder is used to hold an electrode material and/or a conductive agent to appropriate positions and binding them on a conductive metal component to form an electrode.

In some embodiments, the binder is used as a positive electrode binder for binding a positive electrode active material and/or a conductive agent to form an electrode.

In some embodiments, the binder is used as a negative electrode binder for binding a negative electrode active material and/or a conductive agent to form an electrode.

Herein, the term "polymer" involves, on the one hand, the aggregate of macromolecules that are chemically homogeneous but are different in the degree of polymerization, molar mass and chain length, which is prepared by polymerization reaction (copolymerization and homopolymerization). On the other hand, the term also involves the derivatives of such macromolecule aggregates formed by a polymerization reaction, namely, the compounds that can be obtained by the reaction (e.g., addition or substitution) of the functional groups in the above macromolecules and may be chemically homogeneous or chemically heterogeneous.

Herein, the term "$C_{1-3}$ alkyl" means a linear or branched hydrocarbon chain group only consisting of carbon and hydrogen atoms, in which there is no unsaturation, having from one to three carbon atoms, and attached to the rest of the molecule via a single bond. The term "$C_{1-5}$ alkyl" should be interpreted correspondingly. Examples of the $C_{1-3}$ alkyl include, but are not limited to, methyl, ethyl, n-propyl, and 1-methylethyl (isopropyl).

Herein, the term "cyano" means a —CN group.

Herein, the term "aldehyde group" means a —CHO group.

Herein, the term "ester group" means a group having a structural unit of a general formula of —$COOR_9$, wherein $R_9$ is selected from $C_{1-5}$ alkyl unsubstituted or substituted by a substituent. Examples of the ester group include, but are not limited to, methyl ester, ethyl ester, propyl ester, butyl ester, amyl ester, isooctyl ester, etc.

Herein, the term "substituted" means being substituted by a substituent, wherein the substituent is each independently selected from hydroxyl, mercapto, amino, cyano, nitro, an aldehyde group, a halogen atom, $C_{1-6}$ alkyl, and $C_{1-6}$ alkoxy.

Herein, the term "swelling" means the phenomenon that the high molecular polymer absorbs a solvent, resulting in the swelling of the polymer itself and the volume of the electrode comprising same.

In the present application, by comprising a —COOM group (i.e., a carboxylic acid or carboxylate group), the polarity of the polymer can be improved, such that the absorption of the solvent by the binder in the electrolyte solution can be reduced, thereby reducing the swelling rate of the electrodes as well as the direct current resistance of the battery, and improving the power performance and cycling performance of the battery. Meanwhile, the carboxylic acid or carboxylate groups have higher chemical stability and oxidation stability in the electrolyte solution. In addition, the metal cations such as $Li^+$, $Na^+$, etc., which are generated by the ionization of the carboxylates present in the polymer, can increase the content of the dissociated ions in the electrolyte solution of the battery and facilitate the transport of the charge carriers, and thus the dynamic performance of the battery is improved.

In some embodiments, the molar content of the structural unit represented by formula II is 0.1%-60%, or 10%-40%, based on the total number of moles of all structural units in the polymer. In some embodiments, the molar content of the structural unit represented by formula II is 1%-60%, or 2%-60%, or 5%-60%, or 8%-60%, or 10%-60%, or 0.1%-70%, or 0.1%-60%, or 0.1%-50%, or 2%-40%, or 2%-30%, or 5%-50%, or 5%-40%, or 5%-30%, or 5%-20%, or 10%-40%, or 10%-30%, based on the total number of moles of all structural units in the polymer.

If the proportion of the structural unit represented by formula II is too high, the polarity of the polymer is too large, and it is difficult to dissolve in an oily solvent to form an electrode, especially a positive electrode. If the proportion of the structural unit represented by formula II is too low, the polymer is prone to absorb electrolyte solution, and the cycling performance and power performance of the battery will reduced. By controlling the proportion of the structural unit represented by formula II, both the solubility of the binder in an oily solvent and the absorption of the electrolyte solution by the binder can be taken into account, thus reducing the direct current resistance of the battery and improving the power performance and cycling performance of the battery.

In some embodiments, the polymer comprises a first structural unit represented by formula I where $R_4$ is an aldehyde group or an ester group and a second structural unit represented by formula I where $R_4$ is hydrogen or cyano, and the first structural unit is different from the second structural unit.

In some embodiments, the polymer comprises a first structural unit where $R_4$ is an aldehyde group or an ester group and a second structural unit where $R_4$ is hydrogen.

The second structural unit where $R_4$ is hydrogen or cyano provides a hard segment for the polymer, which enables the polymer to have a certain crystallinity, thus providing mechanical strength for the binder and reducing the absorption of the electrolyte solution by the binder. By combining with the first structural unit containing an ester group and an aldehyde group, the polymer can be provided with a soft segment and thus have flexibility as well. Therefore the combination of the first structural unit and the second structural unit enables the polymer to have both strength and flexibility and binding performance. Moreover, the absorption of electrolyte solution by the binder is reduced, thus improving the swelling resistance of the electrode.

In some embodiments, the molar content of the second structural unit is 20%-90%, or 50%-80%, based on the total number of moles of all structural units in the polymer. In some embodiments, the molar content of the second structural unit is 20%-85%, or 20%-80%, or 30%-90%, or 30%-85%, or 30%-80%, or 40%-90%, or 40%-85%, or 40%-80%, or 45%-90%, or 45%-85%, or 45%-80%, or 55%-80%, or 60%-80%, based on the total number of moles of all structural units in the polymer.

If the proportion of the second structural unit in the polymer is too high, the rigidity of the polymer will increase and the binding performance will decrease, and it is difficult to play the role of a binder. If the proportion of the first structural unit in the polymer is too high, the absorption of the electrolyte solution by the polymer will increase, and the swelling resistance of the electrode, the power performance and cycling performance of the battery will decrease. By controlling the proportion of the second structural unit in the polymer, the binding performance of the polymer can be improved and the absorption of the electrolyte solution by the binder can be reduced.

In some embodiments, the polymer has a weight average molecular weight of $5\times10^4$–$1.5\times10^6$, or $1.5\times10^5$–$8\times10^5$. In some embodiments, the polymer has a weight average molecular weight of $2\times10^5$–$8\times10^5$, or $2\times10^5$–$7\times10^5$, or $3\times10^5$–$7\times10^5$, or $2\times10^5$–$6\times10^5$.

Herein, the term "weight average molecular weight" means the statistical average molecular weight averaged by molecular weights of different molecular weights in a polymer.

By controlling the weight average molecular weight of the polymer, the binding performance of the polymer and the reasonable combination of segments with different molecular weight can be ensured, and the dynamic conditions of the electrode can be improved, thereby improving the performance of the battery.

In an embodiment of the present application, provided is a method for preparing a binder, the method comprising:

preparation of an intermediate polymer: polymerizing a monomer represented by formula III to form an intermediate polymer containing at least cyano, an aldehyde group or an ester group, formula III

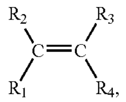

wherein in formula III, $R_1$, $R_2$, and $R_3$ are each independently selected from hydrogen and substituted or unsubstituted $C_{1-3}$ alkyl, and $R_4$ is selected from hydrogen, cyano, an aldehyde group, or an ester group; and modification reaction: subjecting the intermediate polymer and an aqueous solution of an alkaline substance to a modification reaction, such that at least part of the cyano, aldehyde groups or ester groups in the intermediate polymer are converted into COOM groups, wherein M is selected from H, Li, Na, K or $NH_4$.

It should be understand that the modification reaction will not significantly affect the weight average molecular weight of the intermediate polymer, and the difference between the weight average molecular weight of the binder of the present application and that of the corresponding intermediate polymer thereof is not more than 1000.

In some embodiments, the intermediate polymer is obtained through the homopolymerization of one monomer. In some embodiments, the intermediate polymer is obtained through the copolymerization of two or more monomers. In some embodiments, the intermediate polymer is selected from one or more of ethylene-methyl acrylate copolymer, ethylene-methyl methacrylate copolymer, ethylene-ethyl acrylate copolymer, ethylene-pentyl acrylate copolymer, ethylene-isooctyl acrylate copolymer, ethylene-acrylonitrile copolymer, ethylene-acrolein copolymer, acrylonitrile-methyl acrylate copolymer, acrylonitrile-isooctyl acrylate copolymer, acrylonitrile-acrolein copolymer.

In some embodiments, the cyano, aldehyde groups or ester groups of the intermediate polymer are converted into sodium carboxylate groups during the modification reaction under the action of NaOH. In some embodiments, the cyano, aldehyde groups or ester groups of the intermediate polymer are converted into potassium carboxylate groups during the modification reaction under the action of KOH. In some embodiments, the cyano, aldehyde groups or ester groups of the intermediate polymer are converted into ammonium carboxylate groups during the modification reaction under the action of ammonia water. In some embodiments, after the modification reaction, an acidic solution is added to the reaction system to adjust the pH value to be acidic, such that the —COOM groups of the intermediate polymer are converted into carboxylic acid groups.

In some embodiments, in the step of the preparation of the intermediate polymer, the monomer is selected from a first monomer represented by formula III where $R_4$ is cyano, an aldehyde group or an ester group and a second monomer represented by formula III where $R_4$ is hydrogen or cyano, and the second monomer is different from the first monomer in structure.

The method involves a simple preparation process, abundant raw material, and low costs. Through the hydrolysis reaction of cyano group, aldehyde group and ester group under alkaline conditions, they are partially or completely converted into carboxylic acid or carboxylate group, which improves the polarity of the polymer, reduces the absorption of the electrolyte solution by the binder, especially the polyester electrolyte solutions, and simultaneously improves the chemical stability and oxidation stability of the binder. In addition, the metal cations such as $Li^+$, $Na^+$, etc., which are generated by the ionization of the carboxylates present in the polymer, can increase the content of the dissociated ions in the electrolyte solution of the battery and facilitate the transport of the charge carriers, and thus the dynamic performance of the battery is improved.

In some embodiments, the first monomer is selected from one or more of acrolein, acrylonitrile, methyl acrylate, ethyl acrylate, butyl acrylate, isooctyl acrylate, and methyl methacrylate. The above materials are common and easy to obtain, low in cost, and conducive to popularization and application.

In some embodiments, the second monomer is selected from one or more of ethylene, propylene, butylene, and acrylonitrile. The above materials are common and easy to obtain, low in cost, and conducive to popularization and application.

In some embodiments, the molar ratio of the second monomer to the first monomer is 2:8-9:1, optionally 3:7-8:2, further optionally 5:5-8:2.

If the proportion of the second monomer is too high, the flexibility of the binder will be poor, resulting in too high brittleness of the electrode plate and making it difficult to process; and if the proportion of the first monomer is too high, the polarity of the binder will be too high and it is difficult to dissolve in the organic solvent. By adjusting and controlling the proportion of the second monomer to the first monomer in a suitable range, the liquid absorption, flexibility and processability of the binder can be taken into account.

In some embodiments, the intermediate polymer has a weight average molecular weight of $5\times10^4$–$1.5\times10^6$, or $1.5\times10^5$–$8\times10^5$. In some embodiments, the intermediate polymer has a weight average molecular weight of $2\times10^5$–$8\times10^5$, or $2\times10^5$–$7\times10^5$, or $3\times10^5$–$7\times10^5$, or $2\times10^5$–$6\times10^5$.

By controlling the weight average molecular weight of the intermediate polymer, the processability of the intermediate polymer can be adjusted. If the molecular weight is too low, the brittleness is high and the bonding force is insufficient; and if the molecular weight is too high, it is easy to gel, and the modified product is prone to aggregate and difficult to extract.

In some embodiments, the alkaline substance is selected from one or more of lithium hydroxide, sodium hydroxide, potassium hydroxide, and ammonia water. In some embodiments, the alkaline substance is an organic base. The above materials are common and easy to obtain, low in cost, and conducive to popularization and application.

In some embodiments, the molar ratio of the total amount of the cyano, aldehyde and ester functional groups in the first monomer to that of the alkaline substance is 1:0.1-1:2, or 1:0.5-1:1.5. In some embodiments, the molar ratio of the total amount of the cyano, aldehyde and ester functional groups in the first monomer to that of the alkaline substance is 1:0.5-1:2. By adjusting and controlling the molar ratio of the total amount of the cyano, aldehyde and ester functional groups in the first monomer to that of the alkaline substance in a suitable range, the degree of hydrolysis of the functional groups can be controlled, so as to ensure that the absorption of the electrolyte solution by the intermediate polymer is reduced and the solubility thereof in an oily solvent is improved, and meanwhile, the service performance and processability of the electrode plates are taken into account.

In some embodiments, the reaction temperature of the modification reaction is 35° C.-120° C., optionally 60° C.-90° ° C. In some embodiments, the upper limit or the lower limit of the reaction temperature at which the intermediate polymer reacts with the aqueous solution of an alkaline substance is selected from 35° C., 45° ° C., 55° ° C., 60° ° C., 70° ° C., 80° C., 90° ° C., 100° C., and 120° C. By adjusting and controlling the reaction temperature in a suitable range, the degree of hydrolysis of the functional groups can be controlled, so as to ensure that the absorption of the electrolyte solution by the intermediate polymer is reduced and the solubility thereof in an oily solvent is improved, and meanwhile, the service performance and processability of the electrode plates are taken into account.

In some embodiments, the reaction time of the modification reaction is 1 h-24 h, optionally 4 h-10 h. In some embodiments, the reaction time during which the intermediate polymer reacts with the aqueous solution of an alkaline substance is 1 h, 4 h, 8 h, 10 h, 12 h, 18 h, and 24 h. By adjusting and controlling the reaction time in a suitable range, the degree of hydrolysis of the functional groups can be controlled, so as to ensure that the absorption of the electrolyte solution by the intermediate polymer is reduced and the solubility thereof in an oily solvent is improved, and meanwhile, the service performance and processability of the electrode plates are taken into account.

In some embodiments, the method further comprises, at the end of the modification reaction, adding an acidic solution to the reaction product to adjust the pH value of the reaction system to 6-8. In some embodiments, the acidic solution is one or more of a hydrochloric acid solution, a sulfuric acid solution, an oxalic acid solution, and an acetic acid solution. In some embodiments, the mass fraction of the acidic solution is 5-20% by weight.

By adjusting the pH value of the binder to weak acidity or neutrality, it is possible to prevent the binder from causing the gelatinization of the slurry during the preparation of the electrode slurry, thus improving the stability of the slurry.

In an embodiment of the present application, provided is an electrode comprising an electrode active material and a binder of any one of the embodiments or a binder prepared by a method according to any one of the embodiments. The electrode has low swelling rate in the electrolyte solution, such that the internal resistance of the battery is reduced, and the power performance and cycling performance of the battery is improved.

In some embodiments, the electrode active material is a positive electrode active material comprising a lithium-containing transition metal oxide.

In some embodiments, the electrode plate comprises a current collector and an electrode film coated on the surface of the current collector, and the electrode film comprises an electrode active material and a binder of any one of the embodiments or a binder prepared by a method according to any one of the embodiments.

In some embodiments, the mass percentage content of the binder of any one of embodiments or the binder prepared by a method according to any one of the embodiments in the electrode film is 1%-8%, or 1%-4%, or 2%-4%.

In an embodiment of the present application, provided is a battery comprising an electrode of any one of the embodiments. The battery has reduced internal resistance and improved power performance and cycling performance.

In addition, the secondary battery, battery module, battery pack and power consuming device of the present application are described below with reference to the accompanying drawings as appropriate.

In an embodiment of the present application, provided is a secondary battery.

Typically, a secondary battery comprises a positive electrode plate, a negative electrode plate, an electrolyte and a separator. During the charge/discharge of the battery, active ions are intercalated and de-intercalated back and forth between a positive electrode plate and a negative electrode plate. The electrolyte functions to conduct ions between the positive electrode plate and the negative electrode plate. The separator is provided between the positive electrode plate and the negative electrode plate, and mainly prevents the positive and negative electrodes from short-circuiting and enables ions to pass through.

[Positive Electrode Plate]

The positive electrode plate comprises a positive electrode current collector and a positive electrode film layer provided on at least one surface of the positive electrode current collector, the positive electrode film layer comprising the positive electrode active material of the first aspect of the present application.

As an example, the positive electrode current collector has two surfaces opposite in its own thickness direction, and the positive electrode film layer is provided on either or both of opposite surfaces of the positive electrode current collector.

In some embodiments, the positive electrode current collector may be a metal foil or a composite current collector. For example, as a metal foil, an aluminum foil can be used.

The composite current collector may comprise a polymer material base layer and a metal layer formed on at least one surface of the polymer material base layer. The composite current collector can be formed by forming a metal material (aluminum, an aluminum alloy, nickel, a nickel alloy, titanium, a titanium alloy, silver and a silver alloy, etc.) on a polymer material substrate (such as polypropylene (PP), polyethylene terephthalate (PET), polybutylene terephthalate (PBT), polystyrene (PS), polyethylene (PE), etc.).

In some embodiments, the positive electrode active material can be a positive electrode active material known in the art for batteries. As an example, the positive electrode active material may comprise at least one of the following materials: lithium-containing phosphates of an olivine structure, lithium transition metal oxides, and their respective modified compounds. However, the present application is not limited to these materials, and other conventional materials that can be used as positive electrode active materials for batteries may also be used. These positive electrode active materials may be used alone or in combination of two or more. Herein, examples of lithium transition metal oxides may include, but are not limited to, at least one of lithium cobalt oxide (e.g. $LiCoO_2$), lithium nickel oxide (e.g. $LiNiO_2$), lithium manganese oxide (e.g. $LiMnO_2$, $LiMn_2O_4$), lithium nickel cobalt oxide, lithium manganese cobalt oxide, lithium nickel manganese oxide, lithium nickel cobalt manganese oxide (e.g. $LiNi_{1/3}Co_{1/3}Mn_{1/3}O_2$ (also referred to as $NCM_{333}$), $LiNi_{0.5}Co_{0.2}Mn_{0.3}O_2$ (also referred to as $NCM_{523}$), $LiNi_{0.5}Co_{0.25}Mn_{0.25}O_2$ (also referred to as $NCM_{211}$), $LiNi_{0.6}Co_{0.2}Mn_{0.2}O_2$ (also referred to as $NCM_{622}$), $LiNi_{0.8}Co_{0.1}Mn_{0.1}O_2$ (also referred to as $NCM_{811}$)), lithium nickel cobalt aluminum oxide (e.g. $LiNi_{0.85}Co_{0.15}Al_{0.05}O_2$), and modified compounds thereof, etc. Examples of lithium-containing phosphates of olivine structure may include, but are not limited to, at least one of lithium iron phosphate (e.g. $LiFePO_4$ (also referred to as LFP)), lithium iron phosphate and carbon composites, lithium manganese phosphate (e.g. $LiMnPO_4$), lithium manganese phosphate and carbon composites, lithium iron manganese phosphate, and lithium iron manganese phosphate and carbon composites.

In some embodiments, the positive electrode film layer also optionally comprises a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode plate can be prepared as follows: dispersing the above-mentioned components for preparing the positive electrode plate, such as a positive electrode active material, a conductive agent, a binder and any other components, in a solvent (e.g., N-methyl pyrrolidone) to form a positive electrode slurry; and coating the positive electrode current collector with the positive electrode slurry, followed by the procedures such as drying and cold pressing, so as to obtain the positive electrode plate.

[Negative Electrode Plate]

The negative electrode plate comprises a negative electrode current collector and a negative electrode film layer provided on at least one surface of the negative electrode current collector, the negative electrode film layer comprising a negative electrode active material.

As an example, the negative electrode current collector has two surfaces opposite in its own thickness direction, and the negative electrode film layer is provided on either or both of the two opposite surfaces of the negative electrode current collector.

In some embodiments, the negative electrode current collector may be a metal foil or a composite current collector. For example, as a metal foil, a copper foil can be used. The composite current collector may comprise a polymer material base layer and a metal layer formed on at least one surface of the polymer material substrate. The composite current collector can be formed by forming a metal material (copper, a copper alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, the negative electrode active material can be a negative electrode active material known in the art for batteries. As an example, the negative electrode active material may comprise at least one of the following materials: artificial graphite, natural graphite, soft carbon, hard carbon, a silicon-based material, a tin-based material and lithium titanate, etc. The silicon-based material may be selected from at least one of elemental silicon, silicon oxides, silicon carbon composites, silicon nitrogen composites, and silicon alloys. The tin-based material may be selected from at least one of elemental tin, tin oxides, and tin alloys. However, the present application is not limited to these materials, and other conventional materials that can be used as negative electrode active materials for batteries can also be used. These negative electrode active materials may be used alone or as a combination of two or more.

In some embodiments, the negative electrode film layer may optionally comprise a binder. The binder may be selected from at least one of a butadiene styrene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative electrode film layer may optionally comprise a conductive agent. The conductive agent may be selected from at least one of superconductive carbon, acetylene black, carbon black, ketjenblack, carbon dots, carbon nanotubes, graphene, and carbon nanofibers.

In some embodiments, the negative electrode film layer may optionally comprise other auxiliary agents, such as thickener (e.g. sodium carboxymethyl cellulose (CMC-Na)), etc.

In some embodiments, the negative electrode plate can be prepared as follows: dispersing the above-mentioned components for preparing the negative electrode plate, such as negative electrode active material, conductive agent, binder and any other components, in a solvent (e.g. deionized water) to form a negative electrode slurry; and coating a negative electrode current collector with the negative electrode slurry, followed by procedures such as drying and cold pressing, so as to obtain the negative electrode plate.

[Electrolyte]

The electrolyte functions to conduct ions between the positive electrode plate and the negative electrode plate. The type of the electrolyte is not specifically limited in the present application, and can be selected according to actual requirements. For example, the electrolyte may be in a liquid state, a gel state or an all-solid state.

In some embodiments, an electrolyte solution is used as the electrolyte. The electrolyte solution includes an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluorooxalate borate, lithium dioxalate borate, lithium difluorodioxalate phosphate and lithium tetrafluorooxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolyte solution may optionally include an additive. For example, the additive may include a negative electrode film-forming additive and a positive electrode film-forming additive, and may further include an additive that can improve certain performances of the battery, such as an additive that improves the overcharge performance of the battery, or an additive that improves the high temperature or low-temperature performance of the battery.

[Separator]

In some embodiments, the secondary battery further comprises a separator. The type of the separator is not particularly limited in the present application, and any well-known porous-structure separator with good chemical stability and mechanical stability may be selected.

In some embodiments, the material of the separator may be selected from at least one of glass fibers, non-woven fabrics, polyethylene, polypropylene and polyvinylidene fluoride. The separator may be either a single-layer film or a multi-layer composite film, and is not limited particularly. When the separator is a multi-layer composite film, the materials in the respective layers may be same or different, which is not limited particularly.

[Secondary Battery]

In some embodiments, an electrode assembly may be formed by a positive electrode plate, a negative electrode plate and a separator by a winding process or a stacking process.

In some embodiments, the secondary battery may comprise an outer package. The outer package may be used to encapsulate the above-mentioned electrode assembly and electrolyte.

In some embodiments, the outer package of the secondary battery can be a hard shell, for example, a hard plastic shell, an aluminum shell, a steel shell, etc. The outer package of the secondary battery may also be a soft bag, such as a pouch-type soft bag. The material of the soft bag may be plastics, and the examples of plastics may comprise polypropylene, polybutylene terephthalate, polybutylene succinate, etc.

The shape of the secondary battery is not particularly limited in the present application and may be cylindrical, square or of any other shape. For example, FIG. 1 shows a secondary battery 5 with a square structure as an example.

Figure 2:
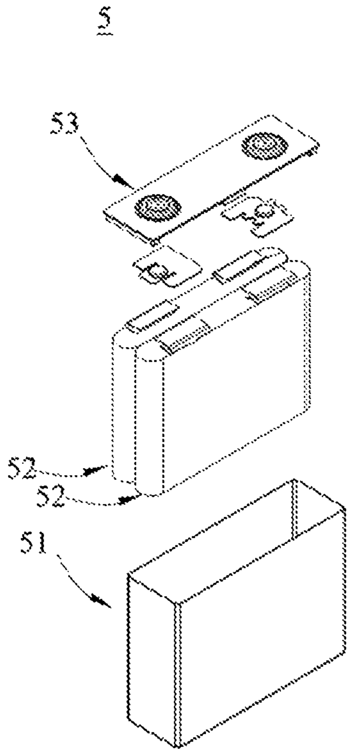
FIG. 2 shows an exploded view of a secondary battery according to an embodiment of the present application as shown in FIG. 1.

In some embodiments, referring to FIG. 2, the outer package may include a housing 51 and a cover plate 53. Herein, the shell body 51 may comprise a bottom plate and side plates connected to the bottom plate, and the bottom plate and the side plates enclose to form an accommodating cavity. The shell body 51 has an opening in communication with the accommodating cavity, and the cover plate 53 may cover the opening to close the accommodating cavity. The positive electrode plate, the negative electrode plate, and the separator may be subjected to a winding process or a laminating process to form an electrode assembly 52. The electrode assembly 52 is encapsulated in the accommodating cavity. The electrolyte solution infiltrates the electrode assembly 52. The number of the electrode assemblies 52 contained in the secondary battery 5 may be one or more, and can be selected by those skilled in the art according to actual requirements.

[Battery Module]

In some embodiments, the secondary battery can be assembled into a battery module, and the number of the secondary batteries contained in the battery module may be one or more, and the specific number can be selected by those skilled in the art according to the application and capacity of the battery module.

Figure 3:
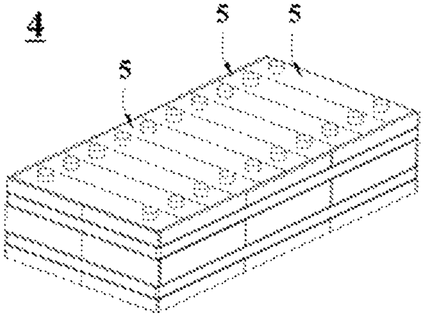
FIG. 3 shows a schematic diagram of a battery module according to an embodiment of the present application.

FIG. 3 shows a battery module 4 as an example. Referring to FIG. 3, in the battery module 4, a plurality of secondary batteries 5 may be arranged in sequence in the length direction of the battery module 4. Apparently, the secondary batteries may also be arranged in any other manner. Furthermore, the plurality of secondary batteries 5 may be fixed by fasteners.

Optionally, the battery module 4 may further comprise an outer shell with an accommodating space, and the plurality of secondary batteries 5 are accommodated in the accommodating space.

[Battery Pack]

In some embodiments, the above battery module may also be assembled into a battery pack, the number of the battery modules contained in the battery pack may be one or more, and the specific number can be selected by those skilled in the art according to the application and capacity of the battery pack.

Figure 4:
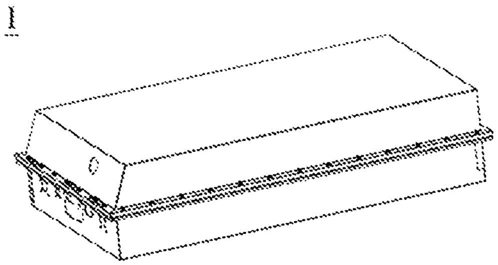
FIG. 4 shows a schematic diagram of a battery pack according to an embodiment of the present application.
Figure 5:
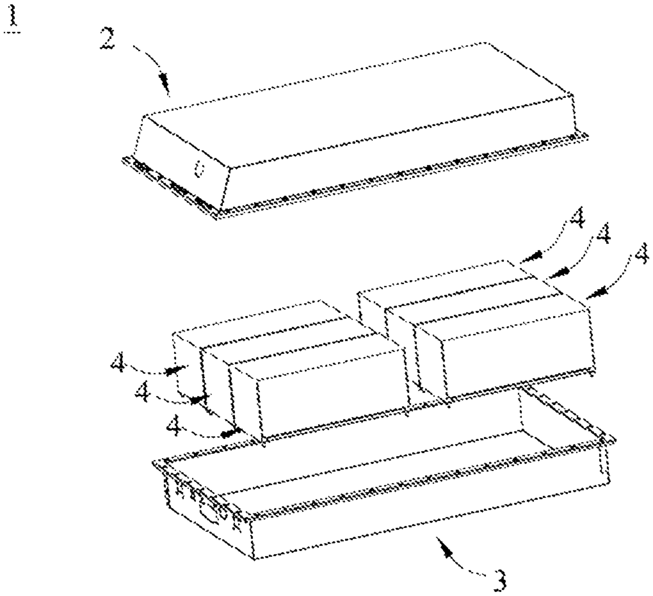
FIG. 5 shows an exploded view of the battery pack according to an embodiment of the present application as shown in FIG. 4.

FIGS. 4 and 5 show a battery pack 1 as an example. Referring to FIG. 4 and FIG. 5, the battery pack 1 may comprise a battery box and a plurality of battery modules 4 provided in the battery box. The battery box comprises an upper box body 2 and a lower box body 3, wherein the upper box body 2 may cover the lower box body 3 to form a closed space for accommodating the battery modules 4. A plurality of battery modules 4 may be arranged in the battery box in any manner.

[Power Consuming Device]

In an embodiment of the present application, provided is a power consuming device comprising a battery of any one of the embodiments.

The power consuming device comprises at least one of the secondary battery, battery module or battery pack provided by the present application. The secondary battery, battery module or battery pack can be used as a power source of the power consuming device or as an energy storage unit of the power consuming device. The power consuming device may include a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck, etc.), an electric train, ship, and satellite, an energy storage system, etc., but is not limited thereto.

As for the power consuming device, the secondary battery, battery module or battery pack can be selected according to the usage requirements thereof.

Figure 6:
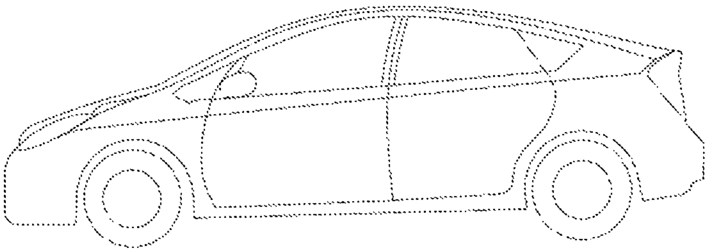
FIG. 6 shows a schematic diagram of a power consuming device using a secondary battery according to an embodiment of the present application as a power source.

FIG. 6 shows a power consuming device as an example. The power consuming device may be a pure electric vehicle, a hybrid electric vehicle, a plug-in hybrid electric vehicle, etc. In order to meet the requirements of the power consuming device for a high power and a high energy density of a secondary battery, a battery pack or a battery module may be used.

As another example, the device may be a mobile phone, a tablet computer, a laptop computer, etc. The device is generally required to be thin and light, and may have a secondary battery used as a power source.

EXAMPLES

Hereinafter, the examples of the present application will be explained. The examples described below are exemplary and are merely for explaining the present application, and should not be construed as limiting the present application. The examples in which techniques or conditions are not specified are based on the techniques or conditions described in documents in the art or according to the product introduction. The reagents or instruments used therein for which manufacturers are not specified are all conventional products that are commercially available.

Example 1

1) Preparation of the Binder

The method for preparing a binder is as follows:

Preparation of an intermediate polymer: 100 g of methyl acrylate (a first monomer), 300 mL of deionized water, 2 g of an emulsifier of alkylphenol polyoxyethylene ether OP-10 and 3 g of ammonium persulfate as an initiator were added into an autoclave, mixed and stirred until uniform, and then heated to a temperature of 90° C.; 8.2 g of ethylene (a second monomer) was introduced for reaction for 6 h with the pressure being controlled at 10 MPa; and after the reaction was completed, the reaction emulsion was exposed at 0° C. for 10 h to precipitate solids, followed by suction filtration and drying to obtain an ethylene-methyl acrylate (a second monomer-first monomer) polymer, i.e., the intermediate polymer, with the molar ratio of ethylene to methyl acrylate in the ethylene-methyl acrylate copolymer being 8:2.

Modification reaction: 100 g of ethylene-methyl acrylate polymer powder and 300 mL of deionized water were charged into a reaction kettle, mixed and stirred for 30 min until uniform; then 12.1 g of LiOH was dissolved into 50 mL deionized water to prepare an alkaline solution, and then added to the reaction kettle; next, the temperature of the reaction kettle was increased to 90° C. for reaction for 4 h; and after the reaction was completed, once upon the temperature of the reaction kettle returned to room temperature, a 5% acetic acid solution was prepared and dropwise added into the reaction kettle to adjust the pH value of the product to be neutral, and then the product was dried to obtain the binder. The modification reaction allows the ester functional groups derived from the first monomer of methyl acrylate in the intermediate polymer to be converted into —COOLi groups.

2) Preparation of the Positive Electrode Plate

The binder prepared in example 1, lithium iron phosphate positive electrode active material, a conductive agent of carbon black, and N-methylpyrrolidone (NMP) were mixed at a weight ratio of 1.28:62.2:0.52:36 and stirred until uniform to obtain a positive electrode slurry; and the positive electrode slurry was then coated onto a positive electrode current collector, followed by drying, cold pressing and slitting to obtain a positive electrode plate.

3) Preparation of the Negative Electrode Plate

An active material of synthetic graphite, a conductive agent of carbon black, a binder of styrene butadiene rubber (SBR) and a thickening agent of sodium carboxymethyl cellulose (CMC-Na) were dissolved into a solvent of deionized water at a weight ratio of 96.2:0.8:0.8:1.2, and uniformly mixed to prepare a negative electrode slurry; and the negative electrode slurry was uniformly coated onto a negative electrode current collector of copper foil for one or several times, followed by drying, cold pressing, and slitting to obtain the negative electrode plate.

4) Separator

A polypropylene film was used as a separator.

5) Preparation of the Electrolyte Solution

In an argon atmosphere glove box ($H_2O$<0.1 ppm, and $O_2$<0.1 ppm), the organic solvents of ethylene carbonate (EC)/ethyl methyl carbonate (EMC) were mixed uniformly in a volume ratio of 3/7, and a lithium salt of LiPF6 was dissolved in the organic solvents to prepare a 12.5% solution, thus obtaining the electrolyte solution.

6) Preparation of the Battery

A positive electrode plate prepared in example 1, a separator and a negative electrode plate were stacked in sequence and then wound to obtain a bare cell, wherein the separator was positioned between the positive electrode plate and the negative electrode plate and functioned for isolation; and the bare cell was welded with tabs and put into an aluminum housing and baked at 80° C. for water removal, and the electrolyte solution was subsequently injected therein, followed by sealing to obtain a uncharged battery. The uncharged battery was then successively subjected to procedures such as leaving to stand, hot and cold pressing, formation, shaping, and capacity tests to obtain a lithium ion battery product of example 1.

The batteries of examples 2-28 and the batteries of comparative examples 1-10 were prepared by a method similar to that in example 1, except that the raw materials and the reaction conditions for preparing the binder were adjusted. The details of different parameters are shown in Table 1.

Specifically, the monomers for preparing the intermediate polymer in example 2 were ethylene and acrylonitrile, and the modification reaction allowed the cyano groups derived from the first monomer of acrylonitrile in the intermediate polymer to be converted into —COOLi groups.

The monomers for preparing the intermediate polymer in example 3 were ethylene and acrolein, and the modification reaction allowed the aldehyde groups derived from the first monomer of acrolein in the intermediate polymer to be converted into —COOLi groups.

The monomers for preparing the intermediate polymer in example 4 were acrylonitrile and methyl acrylate, and the modification reaction allowed the ester groups derived from the first monomer of methyl acrylate in the intermediate polymer to be converted into —COOLi groups.

The monomers for preparing the intermediate polymer in example 5 were acrylonitrile and acrolein, and the modification reaction allowed the aldehyde groups derived from the first monomer of acrylic aldehyde in the intermediate polymer to be converted into —COOLi groups.

The other parameters in examples 2-5 were consistent with those in example 1.

In example 6, the alkaline substance was sodium hydroxide, and the modification reaction allowed the ester functional groups derived from the first monomer of methyl acrylate in the intermediate polymer to be converted into —COONa groups.

In example 7, the alkaline substance was ammonia water, and the modification reaction allowed the ester functional groups derived from the first monomer of methyl acrylate in the intermediate polymer to be converted into $—COONH_4$ groups.

The other parameters in examples 6-7 were consistent with those in example 1.

In example 8, the alkaline substance was potassium hydroxide, and the modification reaction allowed the ester functional groups derived from the first monomer of methyl acrylate in the intermediate polymer to be converted into —COOK groups.

In example 9, during the preparation of the binder, at the end of the modification reaction, a 5% acetic acid solution was added dropwise to adjust the pH value of the product in the reaction kettle to 2-3 and then continuously stirred for 2 h; and then the product was dried, washed with deionized water for 3 times and dried. The modification reaction allowed the ester functional groups derived from the first monomer of methyl acrylate in the intermediate polymer to be converted into —COOH groups.

In example 10, the charging molar ratio of ethylene to methyl acrylate was 6:4.

In example 11, the charging molar ratio of ethylene to methyl acrylate was 5:5.

In example 12, the charging molar ratio of ethylene to methyl acrylate was 4:6.

In example 13, the charging molar ratio of ethylene to methyl acrylate was 3:7.

In example 14, the charging molar ratio of ethylene to methyl acrylate was 2:8.

In example 15, the charging molar ratio of ethylene to methyl acrylate was 9:1.

The other parameters in examples 10-15 were consistent with those in example 1.

In example 16, the molar ratio of methyl acrylate to lithium hydroxide was 1:0.5.

In example 17, the molar ratio of methyl acrylate to lithium hydroxide was 1:1.5.

In example 18, the molar ratio of methyl acrylate to lithium hydroxide was 1:2.

In example 19, the molar ratio of methyl acrylate to lithium hydroxide was 1:0.1.

The other parameters in examples 16-19 were consistent with those in example 1.

In example 20, the reaction temperature of the modification reaction was 35° C.

In example 21, the reaction temperature of the modification reaction was 60° C.

In example 22, the reaction temperature of the modification reaction was 75° C.

In example 23, the reaction temperature of the modification reaction was 120° C.

The other parameters in examples 16-23 were consistent with those in example 1.

In example 24, the reaction temperature of the modification reaction was 60° C., and the reaction time was 0.2 h.

In example 25, the reaction temperature of the modification reaction was 60° C., and the reaction time was 1 h.

In example 26, the reaction temperature of the modification reaction was 60° C., and the reaction time was 8 h.

In example 27, the reaction temperature of the modification reaction was 60° C., and the reaction time was 10 h.

In example 28, the reaction temperature of the modification reaction was 60° C., and the reaction time was 24 h.

The other parameters in examples 24-28 were consistent with those in example 1.

In comparative examples 1-5, the intermediate polymers prepared in examples 1-5 were directly used as binders respectively, and the intermediate polymers undergo the modification reaction without an alkaline substance.

In comparative examples 6-11, the intermediate polymers prepared in examples 10-15 were directly used as binders respectively, and the intermediate polymers undergo the modification reaction without an alkaline substance. The specific parameters are shown in Table 1.

Relevant parameters of the binders of the above examples 1-28 and comparative examples 1-11 are shown in Table 1 below.

In addition, the electrode plates and batteries resulted from the above examples 1-28 and comparative examples 1-11 are tested for performance. The test methods are as follows:

1. Measurement Method of the Weight Average Molecular Weight

The binder obtained in example 1 was vacuum dried in a vacuum oven at 80° C. for 12 h, and 0.1 g of the dried binder was dissolved into 20 mL of N-methylpyrrolidone, and filtered with a membrane having a pore size of 10 μm. 5 mL of filtrate was taken for weight average molecular weight measurement by using a gel permeation chromatograph. The detector used was a differential refractive detection method, and the standard substance was polystyrene.

2. Measurement of the Molar Content $N_{II}$ (%) of the Structural Unit Represented by Formula II In the case of M in formula II is a metal element (i.e., Li, Na, or K), the mass percentage $W_M$ (%) of the metal element M in the binder was measured by using the inductively coupled plasma (ICP) emission spectroscopy. The digestion method was plate digestion, and the digestion solvent was concentrated nitric acid. Before the measurement, the binder sample powder was washed with deionized water for 3 times to remove the free metal ions adsorbed on its surface, and then the product was dried and sent for measurement.

The molar content $N_{II}$ (%) of the structural unit of formula II can be calculated by the following formula:

$$N_{II}(\%)=W_M*M_{total}/M_M$$

in the above formula, $M_{total}$ is the molecular weight of the structural units of the binder, and $M_M$ is the molecular weight of the M element.

In the case of M in formula II is H or $NH_4$, it is necessary to subject the binder to an ion exchange treatment first to replace M with Na. The specific scheme was as follows: 10 g of the binder powder was poured into 200 mL of 5 wt % sodium chloride aqueous solution, and stirred at 40° C. for 1 h for ion exchange, followed by filtration; the resulting powder was washed with deionized water for 3 times to remove the sodium ions adsorbed on its surface, and then the product was dried and sent for ICP to measure the mass percentage $W_{Na}$ (%) of the sodium element.

The molar content $N_{II}$ (%) of the structural unit of formula II can be calculated by the following formula:

$$N_{II}(\%)=W_{Na}*M_{total}/23$$

in the above formula, $M_{total}$ is the molecular weight of the structural units of the binder.

3. Molar Content of the Second Structural Unit

The molar content of the second structural unit=the charging amount of the second monomer/(the charging amount of the second monomer+the charging amount of the first monomer)

4. Test of the Swelling Rate of the Electrode Plate

The test process of the swelling rate of the electrode plate was as follows: the positive electrode plate prepared in the examples or comparative examples was cut into an area of 5*5 cm after cold pressing, weighed and the weight was recorded as $m_0$; meanwhile, after the corresponding battery in the examples or comparative examples is stored at 60° C. for 7 days, then the positive electrode plate was cut into an area of 5*5 cm, and rapidly wiped to remove the residual electrolyte solution on the surface thereof and then weighed and the weight was recorded as $m_1$. The swelling rate of the electrode plate can be calculated by the following formula:

The swelling rate of the electrode plate (%)=$(m_1-m_0)/m_0\times100\%$

5. Test of the Direct-Current Resistance of the Battery

The test process of the direct-current resistance of the battery is as follows: at 25° C., the battery prepared in the examples or comparative examples was charged to 4.3 V at a constant current of ⅓C, then charged to a current of 0.05 C at a constant voltage of 4.3 V, and allowed for standing for 5 min, and the voltage at this time was recorded as $V_1$. Then, the battery was discharged at ⅓C for 30 s, and the voltage at this time was recorded as $V_2$. The internal resistance DCR of the battery after the first cycle was calculated as $(V_2-V_1)$/⅓C.

6. Test of the Capacity Retention Rate of the Battery

The test process of the capacity retention rate of the battery is as follows: at 25° C., the prepared battery was charged to 4.3 V at a constant current of ⅓C, then charged to a current of 0.05 C at a constant voltage of 4.3 V, allowed for standing for 5 min, and then discharged to 2.8 V at current of ⅓C, the obtained capacity being recorded as the initial capacity C0. The above steps were repeated for the same battery above and the discharge capacity Cn of the battery after the $n_{th}$ cycle was also recorded. The capacity retention rate Pn of the battery after each cycle was calculated as Pn=Cn/C0*100%, with the 100 point values of P1, P2, . . . and P100 as the ordinate, and the corresponding numbers of cycles as the abscissa. During this test, the first cycle corresponds to n=1, the second cycle corresponds to n=2, . . . and the $100_{th}$ cycle corresponds to n=100. The capacity retention rate data of batteries corresponding to examples or comparative examples in Table 2 are the data obtained after 100 cycles under the test conditions above, namely, the value of P100. The test process for other examples and comparative examples was the same as above.

The performance test results of the electrode plates and batteries obtained in examples 1-28 and comparative examples 1-11 are shown in Table 1.

TABLE 1

Table of preparation parameters and test results of examples and comparative examples

| | Composition of intermediate polymer (second monomer-first monomer) | Molar ratio between units of intermediate polymer (second monomer: first monomer) | Alkaline substance | Molar ratio of first monomer to alkaline substance | Reaction temperature Reaction temperature/° C. | Reaction time/h | Adjusted pH value of product | Weight average molecular weight of intermediate polymer × $10^5$ | Weight average molecular weight of polymer × $10^5$ |
|---|---|---|---|---|---|---|---|---|---|
| Example 1 | Ethylene-methyl acrylate copolymer | 8:2 | LiOH | 1:1 | 90 | 4 | Neutral | 3 | 3 |
| Example 2 | Ethylene-acrylonitrile copolymer | 8:2 | LiOH | 1:1 | 90 | 4 | Neutral | 3 | 3 |
| Example 3 | Ethylene-acrolein copolymer | 8:2 | LiOH | 1:1 | 90 | 4 | Neutral | 3 | 3 |
| Example 4 | Acrylonitrile methyl acrylate copolymer | 8:2 | LiOH | 1:1 | 90 | 4 | Neutral | 3 | 3 |
| Example 5 | Acrylonitrile-acrolein copolymerymer | 8:2 | LiOH | 1:1 | 90 | 4 | Neutral | 3 | 3 |
| Example 6 | Ethylene-methyl acrylate copolymer | 8:2 | NaOH | 1:1 | 90 | 4 | Neutral | 3 | 3 |
| Example 7 | Ethylene-methyl acrylate copolymerymer | 8:2 | $NH_3•H_2O$ | 1:1 | 90 | 4 | Neutral | 3 | 3 |
| Example 8 | Ethylene-methyl acrylate copolymer | 8:2 | KOH | 1:1 | 90 | 4 | Neutral | 3 | 3 |
| Example 9 | Ethylene-methyl acrylateate copolymer | 8:2 | LiOH | 1:1 | 90 | 4 | Acidic | 3 | 3 |
| Example 10 | Ethylene-methyl acrylate copolymer | 6:4 | LiOH | 1:1 | 90 | 4 | Neutral | 3 | 3 |
| Example 11 | Ethylene-methyl acrylate copolymer | 5:5 | LiOH | 1:1 | 90 | 4 | Neutral | 3 | 3 |
| Example 12 | Ethylene-methyl acrylate copolymer | 4:6 | LiOH | 1:1 | 90 | 4 | Neutral | 3 | 3 |
| Example 13 | Ethylene-methyl acrylate copolymer | 3:7 | LiOH | 1:1 | 90 | 4 | Neutral | 3 | 3 |
| Example 14 | Ethylene-methyl acrylate copolymer | 2:8 | LiOH | 1:0.5 | 90 | 4 | Neutral | 3 | 3 |
| Example 15 | Ethylene-methyl acrylate copolymer | 9:1 | LiOH | 1:2 | 90 | 4 | Neutral | 3 | 3 |
| Example 16 | Ethylene-methyl acrylate copolymer | 8:2 | LiOH | 1:0.5 | 90 | 4 | Neutral | 3 | 3 |

TABLE 1-continued

| | | | | | | | | | |
|---|---|---|---|---|---|---|---|---|---|
| Example 17 | Ethylene-methyl acrylate copolymer | 8:2 | LiOH | 1:1.5 | 90 | 4 | Neutral | 3 | 3 |
| Example 18 | Ethylene-methyl acrylate copolymer | 8:2 | LiOH | 1:2 | 90 | 4 | Neutral | 3 | 3 |
| Example 19 | Ethylene-methyl acrylate copolymer | 8:2 | LiOH | 1:0.1 | 90 | 4 | Neutral | 3 | 3 |
| Example 20 | Ethylene-methyl acrylate copolymer | 8:2 | LiOH | 1:1 | 35 | 4 | Neutral | 3 | 3 |
| Example 21 | Ethylene-methyl acrylate copolymer | 8:2 | LiOH | 1:1 | 60 | 4 | Neutral | 3 | 3 |
| Example 22 | Ethylene-methyl acrylate copolymer | 8:2 | LiOH | 1:1 | 75 | 4 | Neutral | 3 | 3 |
| Example 23 | Ethylene-methyl acrylate copolymer | 8:2 | LiOH | 1:1 | 120 | 4 | Neutral | 3 | 3 |
| Example 24 | Ethylene-methyl acrylate copolymer | 8:2 | LiOH | 1:1 | 60 | 0.2 | Neutral | 3 | 3 |
| Example 25 | Ethylene-methyl acrylate copolymer | 8:2 | LiOH | 1:1 | 60 | 1 | Neutral | 3 | 3 |
| Example 26 | Ethylene-methyl acrylate copolymer | 8:2 | LiOH | 1:1 | 60 | 8 | Neutral | 3 | 3 |
| Example 27 | Ethylene-methyl acrylate copolymer | 8:2 | LiOH | 1:1 | 60 | 10 | Neutral | 3 | 3 |
| Example 28 | Ethylene-methyl acrylate copolymer | 8:2 | LiOH | 1:1 | 60 | 24 | Neutral | 3 | 3 |
| Comparative example 1 | Ethylene-methyl acrylate copolymer | 8:2 | / | / | / | / | / | 3 | 3 |
| Comparative example 2 | Ethylene-acrylonitrile copolymer | 8:2 | / | / | / | / | / | 3 | 3 |
| Comparative example 3 | Ethylene-acrolein copolymer | 8:2 | / | / | / | / | / | 3 | 3 |
| Comparative example 4 | Acrylonitrile-methyl acrylate copolymer | 8:2 | / | / | / | / | / | 3 | 3 |
| Comparative example 5 | Acrylonitrile-methyl acrylate copolymer | 8:2 | / | / | / | / | / | 3 | 3 |
| Comparative example 6 | Ethylene-methyl acrylate | 6:4 | / | / | / | / | / | 3 | 3 |
| Comparative example 7 | Ethylene-methyl acrylate copolymer | 5:5 | / | / | / | / | / | 3 | 3 |
| Comparative example 8 | Ethylene-methyl acrylate copolymer | 4:6 | / | / | / | / | / | 3 | 3 |
| Comparative example 9 | Ethylene-methyl acrylate copolymer | 3:7 | / | / | / | / | / | 3 | 3 |
| Comparative example 10 | Ethylene-methyl acrylate copolymer | 2:8 | / | / | / | / | / | 3 | 3 |
| Comparative example 11 | Ethylene-methyl acrylate copolymer | 9:1 | / | / | / | / | / | 3 | 3 |

TABLE 1-continued

Table of preparation parameters and test results of examples and comparative examples

| | Structural unit represented by formula I | Structural unit represented by formula II | Molar content of structural unit represented by formula II (%) | Molar content of the second structural unit | Swelling rate of electrode plate | Internal resistance (Ω) | Capacity retentionrate (%) |
|---|---|---|---|---|---|---|---|
| Example 1 | 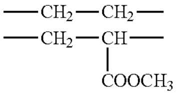 | 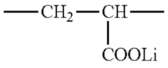 | 18.2 | 80% | 26.6% | 34.3 | 95.9 |
| Example 2 | 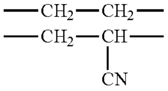 | 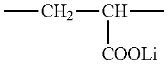 | 16.6 | 80% | 20.7% | 33.7 | 96.1 |
| Example 3 | 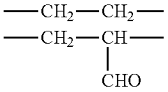 | 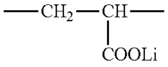 | 18.5 | 80% | 22.5% | 34 | 96 |
| Example 4 | 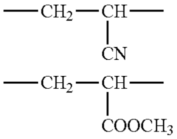 | 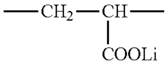 | 16.5 | 80% | 35.1% | 35.3 | 95.4 |
| Example 5 | 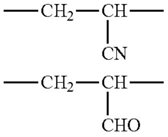 | 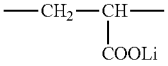 | 17.1 | 80% | 33.5% | 34.3 | 95.6 |
| Example 6 | 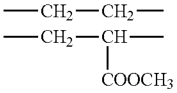 | 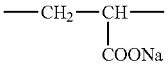 | 19.7 | 80% | 22.3% | 29.8 | 97.9 |
| Example 7 | 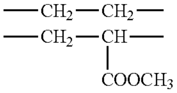 | 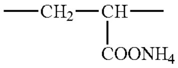 | 18.9 | 80% | 27% | 34.8 | 95.7 |
| Example 8 | 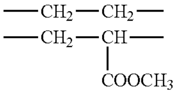 | 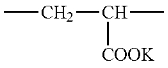 | 19.4 | 80% | 22.9% | 30.4 | 96.8 |
| Example 9 | 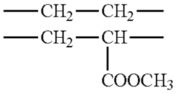 | 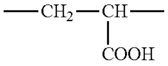 | 18.2 | 80% | 27.3% | 35.3 | 94.4 |
| Example 10 | 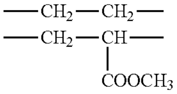 | 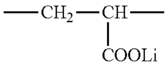 | 22.9 | 60% | 32.6% | 42 | 92.5 |
| Example 11 | 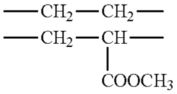 | 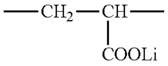 | 36.1 | 50% | 25.5% | 34.8 | 95.4 |
| Example 12 | 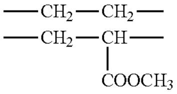 | 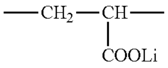 | 44.2 | 40% | 29% | 35.3 | 93.1 |

TABLE 1-continued
| | | | | | | | |
|---|---|---|---|---|---|---|---|
| Example 13 | 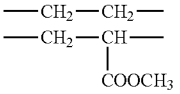 | 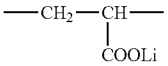 | 59.1 | 30% | 33.7% | 43.6 | 9.9 |
| Example 14 | 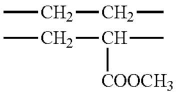 | 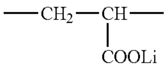 | 39.7 | 20% | 45.4% | 47.9 | 90.1 |
| Example 15 | 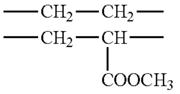 | 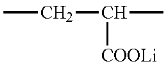 | 9.8 | 90% | 19.4% | 28.9 | 87.4 |
| Example 16 | 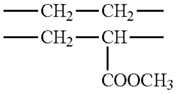 | 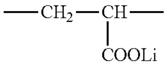 | 10.6 | 80% | 34.7% | 40.5 | 92.2 |
| Example 17 | 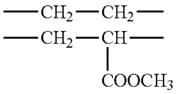 | 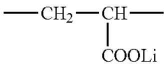 | 19.3 | 80% | 23% | 32.8 | 96.2 |
| Example 18 | 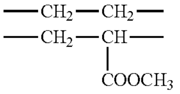 | 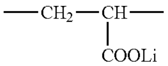 | 19.6 | 80% | 22.6% | 32.1 | 96.9 |
| Example 19 | 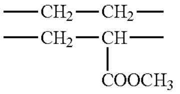 | 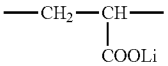 | 1.8 | 80% | 42.2% | 44.8 | 91.7 |
| Example 20 | 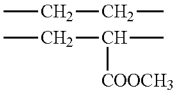 | 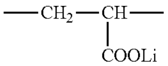 | 10.6 | 80% | 34% | 39.2 | 92.4 |
| Example 21 | 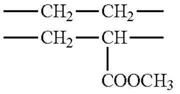 | 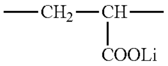 | 16.8 | 80% | 32.7% | 36.2 | 95 |
| Example 22 | 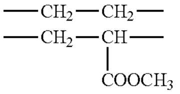 | 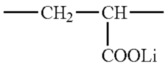 | 17.2 | 80% | 30.1% | 36 | 95.3 |
| Example 23 | 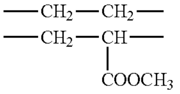 | 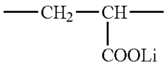 | 19.8 | 80% | 23.1% | 31.9 | 96.5 |
| Example 24 | 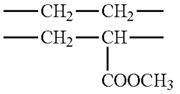 | 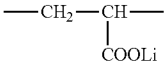 | 0.1 | 80% | 42.2% | 45 | 90.7 |
| Example 25 | 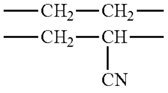 | 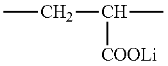 | 8.3 | 80% | 35.9% | 41 | 92.3 |
| Example 26 | 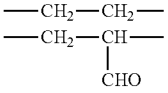 | 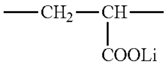 | 17.2 | 80% | 27.7% | 35.6 | 94.2 |

TABLE 1-continued

| | | | | | | | |
|---|---|---|---|---|---|---|---|
| Example 27 | 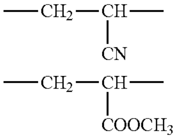 | 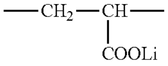 | 19.1 | 80% | 24.6% | 33.3 | 96 |
| Example 28 | 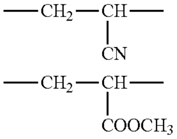 | 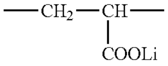 | 20 | 80% | 22.9% | 30.5 | 96.6 |
| Comparative example 1 | 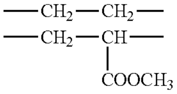 | / | / | 80% | 42.9% | 45.3 | 91 |
| Comparative example 2 | 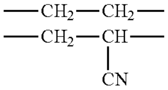 | / | / | 80% | 33.3% | 40.9 | 92.9 |
| Comparative example 3 | 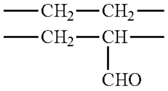 | / | / | 80% | 36.3% | 41.8 | 92.5 |
| Comparative example 4 | 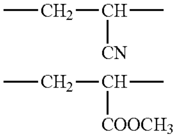 | / | / | 80% | 64.7% | 53.4 | 87.4 |
| Comparative example 5 | 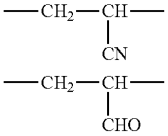 | / | / | 80% | 58.3% | 47.4 | 91.2 |
| Comparative example 6 | 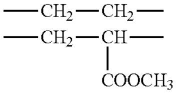 | / | / | 60% | 61.2% | 48.9 | 89.4 |
| Comparative example 7 | 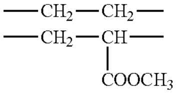 | / | / | 50% | 63.9% | 51.2 | 87.7 |
| Comparative example 8 | 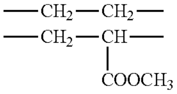 | / | / | 40% | 65.5% | 52.9 | 85.8 |
| Comparative example 9 | 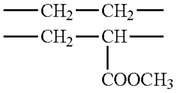 | / | / | 30% | 66.8% | 53.2 | 82.4 |
| Comparative example 10 | 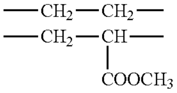 | / | / | 20% | 68% | 54.7 | 81.5 |
| Comparative example 11 | 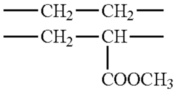 | / | / | 90% | 20.2% | — | — |

Note:
/means that the step is not included in the reaction or the structural unit is not comprised in the product.

In examples 1-28, provided is a binder, which is a polymer containing the structural units as represented by formula I and formula II, formula I

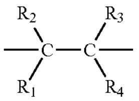

formula II

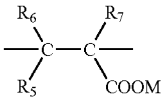

wherein $R_1$, $R_2$, $R_3$, $R_5$, $R_6$, and $R_7$ are each independently selected from hydrogen, $R_4$ is selected from hydrogen, cyano, an aldehyde group, or an ester group, and M is selected from H, Li, Na, K or $NH_4$. All the electrode plates have reduced swelling rate, and the corresponding batteries have reduced internal resistance and increased cycling capacity retention rate, compared to those in comparative examples 1-11.

In examples 1-28, the molar content of the structural unit represented by formula II is 0.1%-60%, based on the total number of moles of all structural units in the polymer. All the electrode plates have reduced swelling rate, and the corresponding batteries have reduced internal resistance and increased capacity retention rate, compared to those in comparative examples 1-11. In examples 1-28, when the molar content of the structural unit represented by formula II is 10%-40%, the batteries have significantly reduced internal resistance and higher cycling capacity retention rate.

In examples 1-28, the polymer comprises a first structural unit represented by formula I where $R_4$ is cyano, an aldehyde group or an ester group and a second structural unit represented by formula I where $R_4$ is hydrogen or cyano, and the first structural unit is different from the second structural unit. All the electrode plates have reduced swelling rate, and the corresponding batteries have reduced internal resistance and increased cycling capacity retention rate, compared to those in comparative examples 1-11.

In examples 1-28, the molar content of the second structural unit is 20%-90%, based on the total number of moles of all structural units in the polymer. All the electrode plates have reduced swelling rate, and the corresponding batteries have reduced internal resistance and increased cycling capacity retention rate, compared to those in comparative examples 1-11. In example 15, when the proportion of the structural units derived from ethylene monomers in the polymer is 90%, the electrode plates have lower swelling rate, but the electrode plates have poor binding performance and the corresponding batteries show poor cycling stability and thus reduced cycling capacity retention rate. When the molar content of the second structural unit is 50%-80%, based on the total number of moles of all structural units in the polymer, the batteries have lower internal resistance and higher cycling capacity retention rate.

It should be noted that the present application is not limited to the above embodiments. The above embodiments are exemplary only, and any embodiment that has substantially the same constitutions as the technical ideas and has the same effects within the scope of the technical solution of the present application falls within the technical scope of the present application. In addition, without departing from the gist of the present application, various modifications that may be conceived by those skilled in the art to the embodiments, and other modes constructed by combining some of the constituent elements of the embodiments also fall within the scope of the present application.

What is claimed is:

1. A method for preparing a binder, wherein the binder is a polymer containing structural units as represented by formula I and formula II, formula I

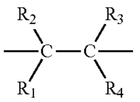

formula II

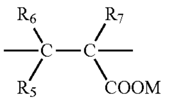

wherein $R_1$, $R_2$, $R_3$, $R_5$, $R_6$, and $R_7$ are each independently selected from hydrogen or substituted or unsubstituted $C_{1-3}$ alkyl, $R_4$ is selected from hydrogen, cyano, an aldehyde group, or an ester group, and M is selected from H, Li, Na, K or $NH_4$;

the polymer comprises a first structural unit represented by formula I where $R_4$ is an aldehyde group or an ester group and a second structural unit represented by formula I where $R_4$ is hydrogen or cyano, wherein the first structural unit is different from the second structural unit;

a molar content of the structural unit represented by formula II is 0.1%-60%, based on a total number of moles of all structural units in the polymer;

wherein the method comprises:

preparing an intermediate polymer comprising polymerizing a monomer represented by formula III to form the intermediate polymer containing at least cyano, an aldehyde group, or an ester group, formula III

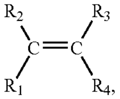

wherein in the formula III, $R_1$, $R_2$, and $R_3$ are each independently selected from hydrogen and substituted or unsubstituted $C_{1-3}$ alkyl, and $R_4$ is selected from hydrogen, cyano, an aldehyde group, or an ester group;

wherein the monomer is selected from a first monomer represented by formula III where $R_4$ is an aldehyde group or an ester group and a second monomer represented by formula III where $R_4$ is hydrogen or cyano, the first monomer corresponds to the first structural unit, the second monomer corresponds to the second structural unit, and the second monomer is different from the first monomer in structure; and performing a modification reaction comprising subjecting the intermediate polymer and an aqueous solution of an alkaline substance to a modification reaction, such that at least part of the cyano, aldehyde groups or ester groups in the intermediate polymer are converted into COOM groups, wherein M is selected from H, Li, Na, K or $NH_4$.

2. The method according to claim 1, wherein a molar content of the second structural unit is 20%-90%, based on the total number of moles of all structural units in the polymer.

3. The method according to claim 1, wherein a molar ratio of the second monomer to the first monomer is 2:8-9:1.

4. The method according to claim 1, wherein the first monomer is selected from one or more of acrolein, acrylonitrile, methyl acrylate, ethyl acrylate, butyl acrylate, isooctyl acrylate, and methyl methacrylate.

5. The method according to claim 1, wherein the second monomer is selected from one or more of ethylene, propylene, butylene, and acrylonitrile.

6. The method according to claim 1, wherein the intermediate polymer has a weight average molecular weight of $5\times10^4$-$1.5\times10^6$ g/mol.

7. The method according to claim 1, wherein the alkaline substance is selected from one or more of lithium hydroxide, sodium hydroxide, potassium hydroxide, and ammonia water.

8. The method according to claim 1, wherein a molar ratio of a total amount of the cyano, aldehyde and ester functional groups in the first monomer to a total amount of the alkaline substance is 1:0.1-1:2.

9. The method according to claim 1, wherein a reaction temperature of the modification reaction is 35° C.-120° C.

10. The method according to claim 1, wherein a reaction time of the modification reaction is 1 h-24 h.

11. The method according to claim 1, further comprising:
after performing the modification reaction, adding an acidic solution to a reaction mixture of the modification reaction to adjust a pH value of the modification reaction mixture to 6-8.

* * * * *